(12) United States Patent
Pergal

(10) Patent No.: US 10,582,396 B2
(45) Date of Patent: *Mar. 3, 2020

(54) WIRELESS REPEATER WITH ARBITRARY PROGRAMMABLE SELECTIVITY

(71) Applicant: Frank Pergal, Gloucester, MA (US)

(72) Inventor: Frank Pergal, Gloucester, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/225,899

(22) Filed: Aug. 2, 2016

(65) Prior Publication Data

US 2017/0026851 A1     Jan. 26, 2017

Related U.S. Application Data

(63) Continuation of application No. 14/305,751, filed on Jun. 16, 2014, now Pat. No. 9,407,351, which is a continuation of application No. 13/618,027, filed on Sep. 14, 2012, now Pat. No. 8,755,740, which is a continuation of application No. 12/614,624, filed on Nov. 9, 2009, now Pat. No. 8,290,430, which is a continuation of application No. 11/187,520, filed on Jul. 22, 2005, now Pat. No. 7,623,826.

(60) Provisional application No. 60/590,318, filed on Jul. 22, 2004.

(51) Int. Cl.
*H04W 16/26* (2009.01)
*H04B 7/155* (2006.01)
*H04B 1/10* (2006.01)
*H04W 84/04* (2009.01)

(52) U.S. Cl.
CPC ............ *H04W 16/26* (2013.01); *H04B 1/10* (2013.01); *H04B 7/15542* (2013.01); *H04B 7/15585* (2013.01); *H04B 7/15564* (2013.01); *H04W 84/047* (2013.01)

(58) Field of Classification Search
CPC .. H04B 7/15542; H04B 7/15; H04B 7/15564; H04B 10/0795; H04B 1/005; H04B 7/15507; H04B 1/525; H04B 7/0857; H04B 7/0404; H04B 7/15535; H03F 2201/3206; H03F 2201/3227; H04W 24/02; H04W 88/04; H04J 1/08
See application file for complete search history.

(56) References Cited

U.S. PATENT DOCUMENTS

| | | | | |
|---|---|---|---|---|
| 4,355,405 A | * | 10/1982 | Ruys | H04Q 1/4575 370/526 |
| 5,027,410 A | * | 6/1991 | Williamson | H04R 25/453 381/314 |
| 5,828,954 A | * | 10/1998 | Wang | H04H 20/57 455/260 |
| 6,323,795 B1 | * | 11/2001 | Yang | H03M 3/504 341/143 |
| 7,200,166 B1 | * | 4/2007 | Miao | H04B 1/406 375/219 |

(Continued)

*Primary Examiner* — Lewis G West
(74) *Attorney, Agent, or Firm* — Nextwave IP Legal Services, LLC; Leon R. Fortin, Jr.

(57) ABSTRACT

The invention relates to wireless repeater systems and methods. In embodiments, such systems and methods involve receiving a wireless transmission signal; and processing the wireless transmission signal using a digital signal processing facility (DSP); wherein the DSP is adapted to filter at least one sub-band of the wireless transmission signal using a digital bandpass filter.

19 Claims, 13 Drawing Sheets

(56) References Cited

U.S. PATENT DOCUMENTS

| | | | |
|---|---|---|---|
| 7,623,826 B2 * | 11/2009 | Pergal | H04B 7/15542 370/226 |
| 8,755,740 B2 * | 6/2014 | Pergal | H04B 7/15542 370/315 |
| 2003/0045312 A1 * | 3/2003 | Wildhagen | H04B 1/1692 455/501 |
| 2003/0232595 A1 * | 12/2003 | Baker | H04B 7/15535 455/11.1 |
| 2003/0232607 A1 * | 12/2003 | Le Bars | H04L 27/361 455/126 |
| 2004/0043730 A1 * | 3/2004 | Schill | H04H 20/26 455/130 |
| 2005/0048927 A1 * | 3/2005 | Kemmochi | H01P 1/15 455/78 |
| 2005/0215193 A1 * | 9/2005 | Kummetz | H04B 7/15585 455/1 |

* cited by examiner

WIRELESS REPEATER WITH ARBITRARY PROGRAMMABLE SELECTIVITY

RELATED APPLICATIONS

This application is a continuation of U.S. application Ser. No. 14/305,751 filed Jun. 16, 2014. U.S. application Ser. No. 14/305,751 is a continuation of U.S. application Ser. No. 13/618,027, filed Sep. 14, 2012, which is now U.S. Pat. No. 8,755,740, issued Sep. 14, 2012. U.S. application Ser. No. 13/618,027 is a continuation of U.S. application Ser. No. 12/614,624, filed Nov. 9, 2009, which is now U.S. Pat. No. 8,290,430, issued Oct. 16, 2012. U.S. application Ser. No. 12/614,624 is a continuation of U.S. application Ser. No. 11/187,520, filed Jul. 22, 2005, which is now U.S. Pat. No. 7,623,826, issued Nov. 24, 2009. U.S. Ser. No. 11/187,520 claims the benefit of U.S. Provisional Patent Application No. 60/590,318, filed Jul. 22, 2004. Also of which are incorporated herein in its entirety.

BACKGROUND

1. Field

The present invention relates to wireless communication repeaters; and more particularly, embodiments of the present invention relate to wireless communication repeaters using digital signal processing.

2. Description of Related Art

Wireless repeaters are generally used to repeat signals and to extend the range of wireless transmitters. Many wireless transmitters use circuitry that makes the repeaters large, expensive and difficult to modify. With the development of cell phone communications came the general desire of people to be continually connected to their cell phone network provider, even in areas where signal strength from the provider is limited. As a result, cell phone carrier providers have been continually increasing the number of transmission towers to cover more area. However, they still rely on repeaters to communicate through large structures, such as shopping malls and the like. There exists a need for an improved wireless communication repeater the is easy to modify, smaller and or less expensive.

SUMMARY

The invention relates to wireless repeater systems and methods. In embodiments, such systems and methods involve receiving a wireless transmission signal; and processing the wireless transmission signal using a digital signal processing facility (DSP); wherein the DSP is adapted to filter at least one sub-band of the wireless transmission signal using a digital bandpass filter.

DETAILED DESCRIPTION OF THE PREFERRED EMBODIMENT(S)

The present invention relates to techniques that enable implementation of bi-directional repeaters with arbitrary programmable selectivity over the wireless telephony bands. The need for programmable selectivity may be driven by the presence of undesired radio interference and or patterns of frequency allocation by regulatory agencies within a given geographical area.

Typically, a telephony band is partitioned into sub-bands. In order to pass the assigned sub-bands and reject non-assigned bands or radio interference, filtering is required. Conventional analog RF filters at wireless telephony frequencies are costly, large and complex because of Q-factor considerations. By down converting and digitizing the telephony band in question, the filtering problem may be addressed economically. Furthermore, digitizing permits filtering parameters to be changed easily in response to changing conditions and facilitates implementation of additional signal processing techniques (e.g. adaptive cancellation or nulling) that may otherwise be impractical.

The present invention relates to applications to the principal wireless telephony services allocated in North America, referred to as PCS and Cellular. Other services, such as SMR or European DECT, which may also be repeated using the techniques described in this disclosure are not addressed specifically; however, such repeater techniques are encompassed by the present invention. PCS (Personal Communications Service) is allocated the frequencies from 1860 MHz to 1910 MHz (mobile handset transmit) and from 1930 MHz to 1990 MHz (base station transmit). Cellular is allocated the frequency bands 840 MHz to 870 MHz (mobile transmit) and 880 MHz to 910 MHz (base transmit).

Figure 1:
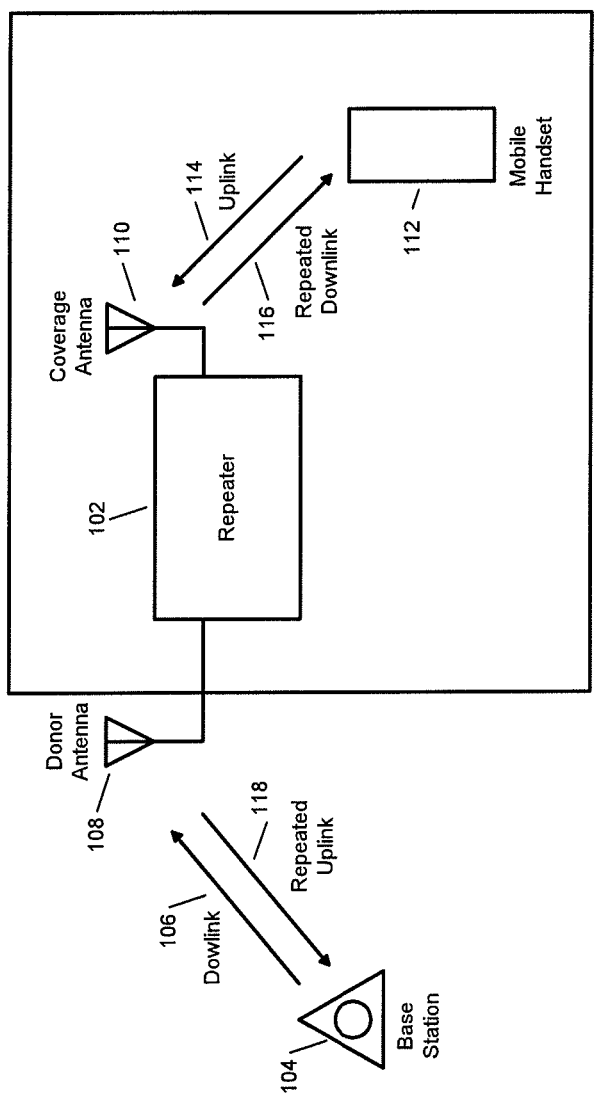
FIG. 1 illustrates a repeater installation.

In order to provide service within buildings or other remote or enclosed areas, a wireless telephony carrier, such as Nextel, AT&T or T-Mobile, may install one or more repeaters 102 as shown in FIG. 1. Referring to FIG. 1, a base station 104 transmits a downlink 106 signal that may comprise one or more modulated carriers. The composite signal is received, typically by a roof-mounted donor antenna 108, amplified and re-radiated as the repeated downlink 116 signal using an indoor coverage antenna 110. The indoor coverage antenna 110 may be a single antenna or array of antennas with associated feed structure. The signal is received by one or more mobile handsets 112. In the reverse or uplink 114 direction, handsets 112 transmit signals that are received by the coverage antenna 110, amplified by the repeater 102 and re-radiated as the repeated uplink 118 signal by the donor antenna 108.

FCC Type Acceptance requirements are primarily concerned with non-linearity and spectral emissions limits. Because of the radiated power asymmetry between the base station 104 and the repeater 102, signal to noise ratios of downlink 106 signals are usually high and repeater noise figure is not generally an operational issue. Noise figure performance is rather set by industry accepted convention.

Figure 2:
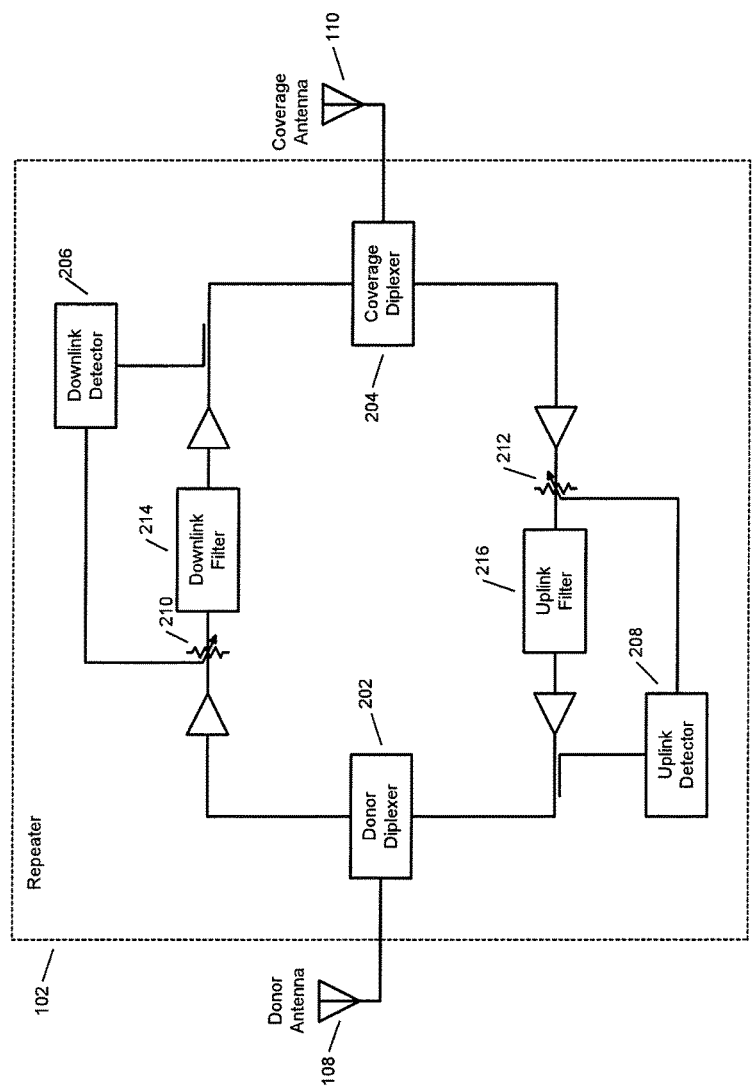
FIG. 2 illustrates a block diagram of a repeater.

A bi-directional repeater block diagram is shown in FIG. 2. In FIG. 2 the donor and coverage antennas connect to donor and coverage frequency diplexers, 202 and 204, respectively. The diplexers 202 and 204 provide separation between the uplink and downlink signals. Amplification may be variable to accommodate varying composite signal power. In both uplink and downlink directions the repeater may use detectors 206 and 208 to sense repeater output power levels. The detected downlink and uplink signal levels may be used to control variable RF attenuators 210 and 212 in-line with the signal amplifiers. The resulting level control loops prevent the amplifiers from overloading in the presence of strong signals. Band limiting filters 214 and 216 may also be included in the signal paths to prevent leakage signal amplification.

It may be desirable that the repeater of FIG. 1 amplifies the sub-bands assigned to a given carrier and excludes those sub-bands assigned to competing carriers. If, for example, a given repeater is substantially closer to a base station belonging to a competing carrier, then signals originated by the competing carrier's base station may limit the output power available to desired signals. The situation may also arise in which one carrier could object to giving a competitor free access to its repeaters.

At a given location a wireless carrier may be allocated several non-contiguous sub-bands with bandwidths as narrow as 5 MHz ranging up to the full PCS bandwidth of 60 MHz. The repeater architecture shown in FIG. 3 provides arbitrary selective amplification of non-contiguous sub-bands by using an all-digital multi-band IF filter.

Figure 3:
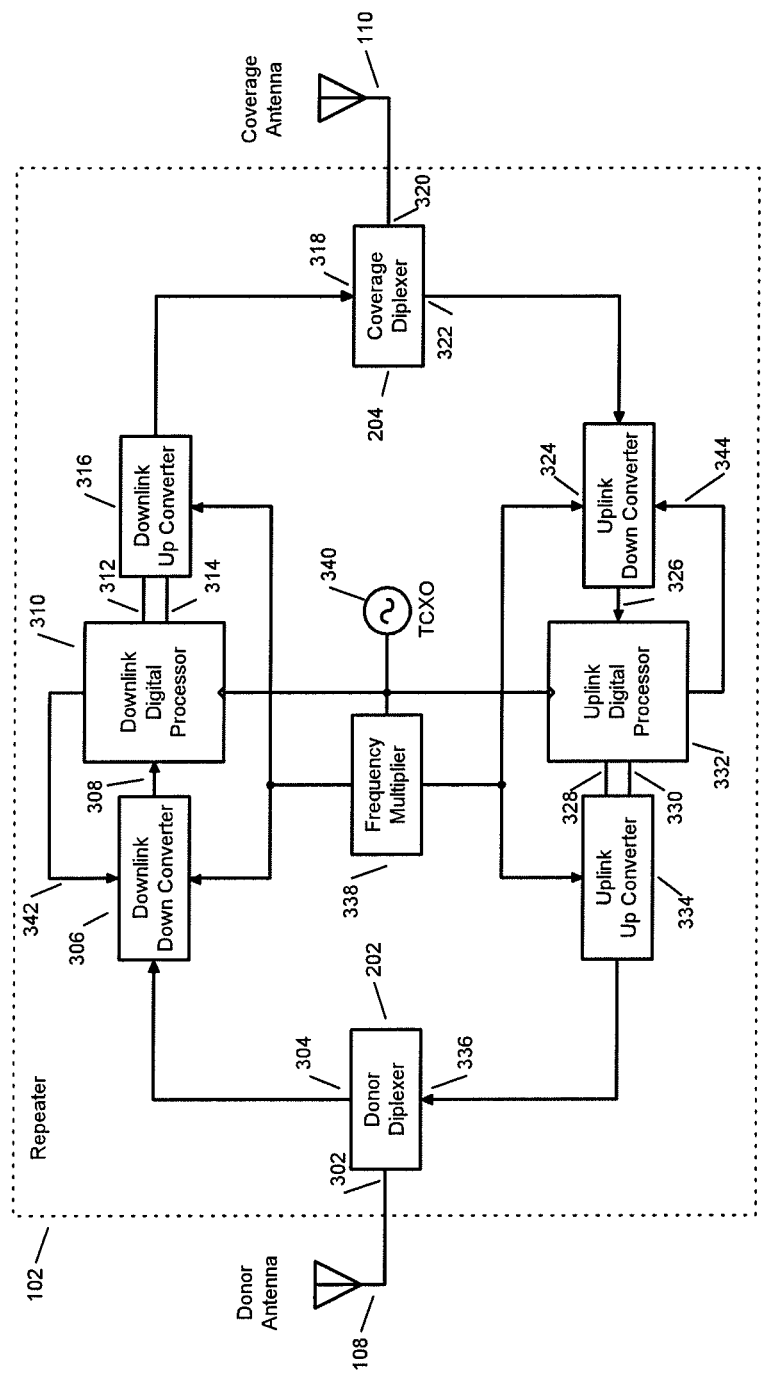
FIG. 3 illustrates a repeater with arbitrary programmable selectivity.

The repeater of FIG. 3 comprises downlink and uplink arms connected by frequency diplexers 202 and 224. The downlink and uplink arms comprise downconverters 306 and 324, respectively, digital processors 310 and 332, respectively, and upconverters 316 and 334, respectively. In the preferred implementation the hardware comprising the downlink and uplink arms is identical with the exception of filter frequencies. A single local oscillator frequency is employed for all frequency conversions. Since the uplink arm is identical to the downlink arm in the preferred implementation, with the exception of frequencies, details are discussed only for the downlink arm of the repeater. Other architectures, not exhibiting the symmetric character of the preferred implementation, may be used in a given application and are encompassed by the present invention.

The architecture of the preferred implementation is suitable for PCS, Cellular and other wireless telephony services. Such applications of the repeater architecture of FIG. 3 are encompassed by the present invention.

Referring to FIG. 3, downlink signals, transmitted by one or more cellular base stations are received by a donor antenna 108. The composite received signal is fed to the common port 302 of a donor frequency diplexer 202. The diplexer downlink output port 304 is routed to the downlink frequency down converter 306 which produces a band limited intermediate frequency (IF) output signal 308. The downconverter IF output signal 308 is digitized and processed as an IF signal by the Downlink Digital Processor 310 without further frequency conversion to base band signals either external or internal to the Downlink Digital Processor.

The processed IF signal is then converted into inphase and quadrature analog IF frequency signals, 312 and 314, respectively. The inphase and quadrature analog signals 312 and 314 are upconverted by the downlink up converter 316, then amplified and fed to the downlink input 318 of a coverage frequency diplexer 204. Because of the filtering action of the Downlink Digital Processor 310, unwanted sub-band signals are not amplified or radiated, thereby permitting desired sub-bands use of the full repeater output dynamic range. The coverage diplexer's 204 output is radiated as the repeated downlink 116 signal by the coverage antenna 110, (e.g. an in-building antenna), and received by mobile users' handsets.

A mobile handset transmits a signal which, in combination with other mobile handset transmitted signals, comprises the uplink signal 114. The composite uplink signal 114 is received by the in-building coverage antenna 110 and fed to the common port 320 of the coverage frequency diplexer 204. The uplink output 322 of the coverage diplexer 204 is routed to an uplink frequency downconverter 324. The uplink downconverter 324 produces an IF output 326 which is digitized, processed, converted to inphase and quadrature uplink analog signals 328 and 330 by the Uplink Digital Processor 332 and upconverted by the uplink frequency upconverter 334 to the uplink frequency band. The composite uplink signal is then amplified, fed to the uplink input port 336 of the donor diplexer 202 and radiated as the repeated uplink 118 signal via the donor antenna 108. A frequency multiplier 338 driven by a temperature controlled crystal oscillator (TCXO) 340 generates local oscillator signals (LOs) which drive the frequency converters 306, 316, 324 and 334 and provide clock signals to the digital processors 310 and 322.

Figure 4:
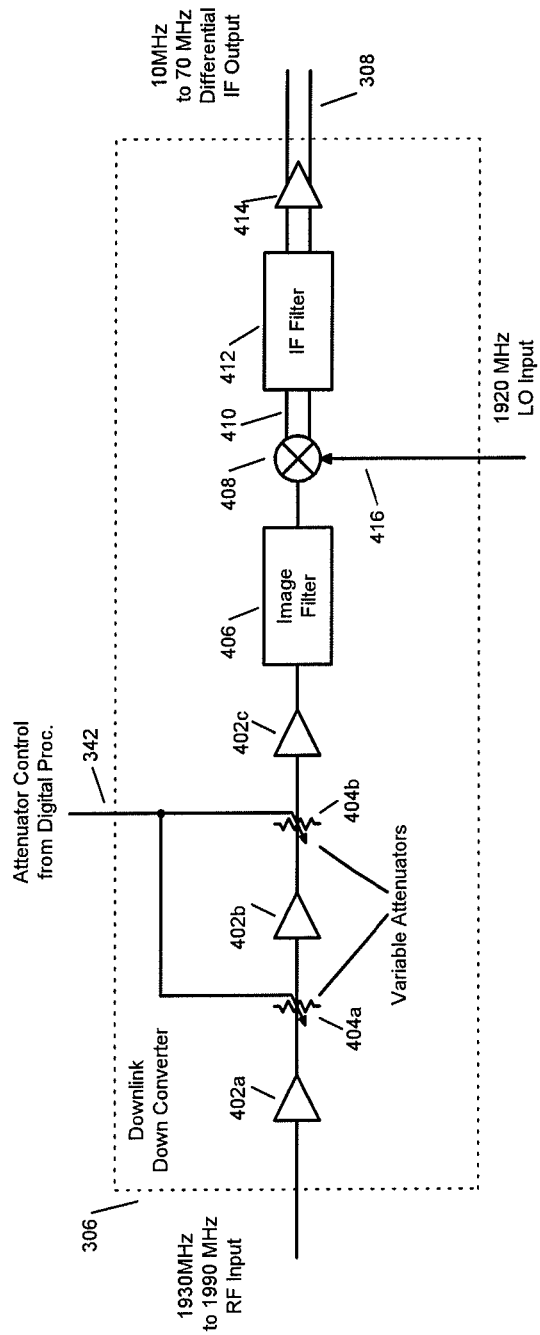
FIG. 4 illustrates a repeater down converter.

Referring to FIG. 4, in the preferred PCS implementation, the downlink down converter 306 comprises one or more amplifiers 402a, 402b and 402c, variable attenuators 404a and 404b, an image noise filter 406, a down converting frequency mixer 408 with differential output 410, a differential IF filter 412 and differential buffer amplifier 414. Attenuators 404a and 404b are automatically adjusted under control of the Downlink Digital Processors 310 in order to maintain the signal into the Downlink Digital Processor 310 at a prescribed level. The image noise filter 406 passes the desired downlink band and rejects out-of-band noise and signals (including uplink signal leakage). With the frequency mixer local oscillator signal 416 set at 1920 MHz, the downlink signal mixes with the local oscillator signal and is frequency converted to the downlink IF signal 418, without spectrum inversion, in the frequency band from 10 MHz to 70 MHz. Other choices of LO and IF frequency are possible and may offer particular advantages in a given application; such choices are encompassed by the present invention. The downconverted downlink IF signal 418 is filtered in order to reject spurious mixer output signals and used to drive the Downlink Digital Processor 310. Differential configuration is used throughout the down converter IF circuitry. A single-ended configuration may also be used in the IF circuitry; use of single-ended IF circuitry is encompassed by the present invention. The differential configuration offers higher resistance to noise and digitally generated spurious signals in exchange for a moderate increase in complexity. FIG. 4 also applies to the uplink down converter which may be identical to the downlink down converter, with the exception that the image noise filter 406 passes the uplink rather than downlink band.

Figure 5:
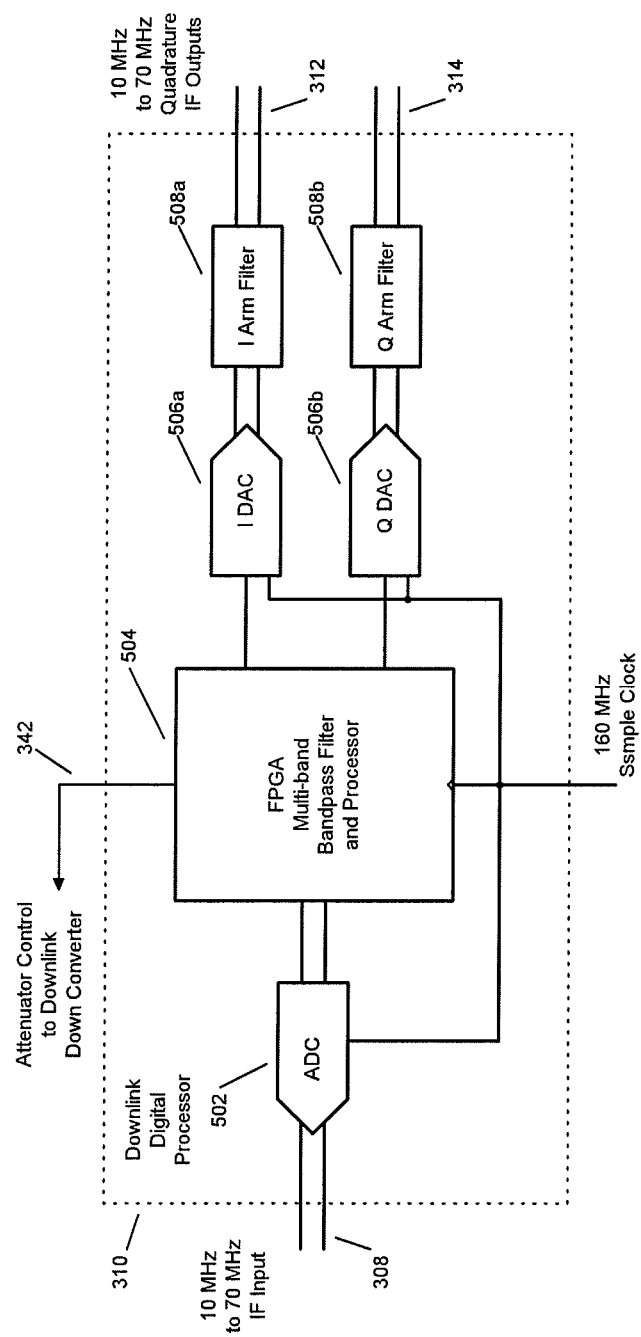
FIG. 5 illustrates a repeater digital processor.

Referring to FIG. 5, the Downlink Digital Processor signal path circuitry comprises an ADC 502 (Analog to Digital Converter) driving an FPGA 504 (Field Programmable Gate Array) differentially which in turn drives a dual interpolating DAC 506a and 506b (Digital to Analog Converter). The dual DAC's 506a and 506b outputs are band pass filtered by filters 508a and 508b to produce analog inphase and quadrature IF outputs 312 and 314. The differential interface between the ADC 502 and FPGA 504 provides containment of digitally generated noise. A single-ended interface may also be used in certain applications; such use is encompassed by the present invention.

The ADC 502 samples and digitizes the input IF signal. In the preferred implementation the sample clock frequency is chosen to be 160 MHz; although other sample rates may be used. In particular, the choice of sample rate equal to an odd quarter multiple of the IF center frequency allows simple means of converting the bandpass IF signal into base band inphase and quadrature signals under certain circumstances. The 160 MHz sample rate of the preferred implementation is high enough to permit relatively easy filtering of potential signal aliases in the preceding downconverter. The sample rate is also the twelfth sub-harmonic of the local oscillator frequency and has no harmonic falling in either the uplink or downlink signal passbands. Sample rates other than 160 MHz may be used and such use is encompassed by the present invention.

The ADC 502 in the Downlink Digital Processor 310 drives the FPGA 504 differentially with digitized IF samples. The primary function of the FPGA 504 is to implement a multi-sub-band filter bank. One or more band pass FIR (Finite Impulse Response) filters are designed to pass prescribed sub-bands between 10 MHz and 70 MHz, each filter being represented by a set of coefficients. Since in repeater applications, only one composite multi-band output is required, coefficients for a composite multi-band filter may be generated by adding the coefficients for the individual sub-band filters. The multi-band composite filter uses only slightly more FPGA resources than a filter for a single sub-band for a given performance specification.

Figure 6:
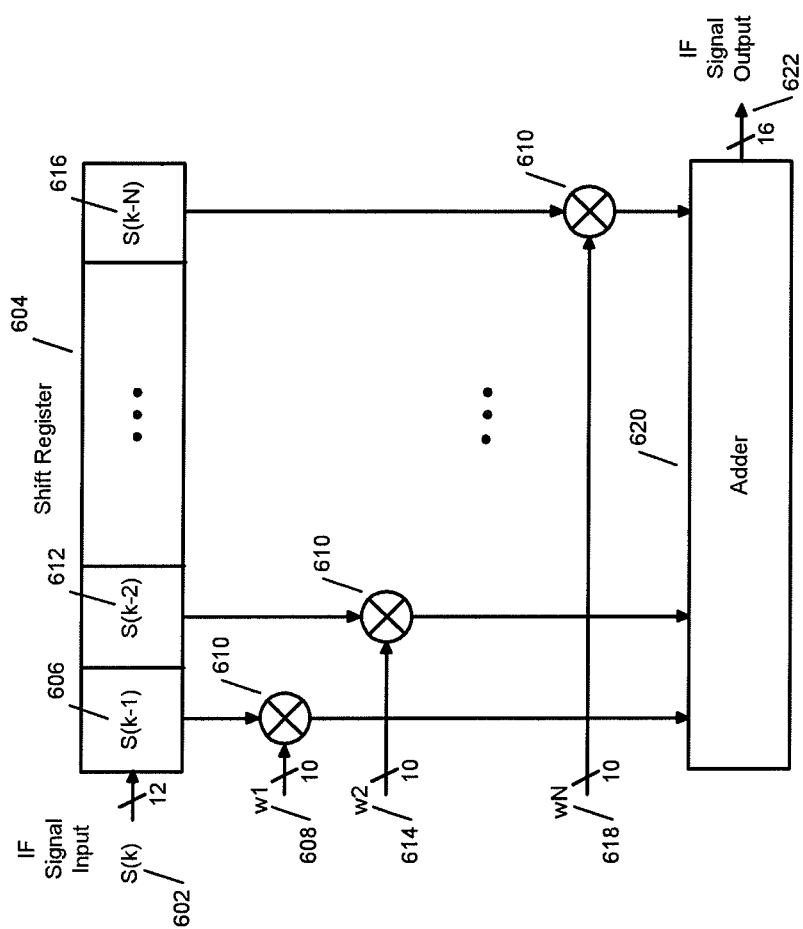
FIG. 6 illustrates an IF bandpass FIR filter structure.

FIG. 6 shows details of an IF bandpass FIR structure corresponding to a single sub-band filter. The IF signal input samples represented by quantities S(k) 602 in FIG. 6 are continuously loaded into a shift register 604 of length N. The newest shift register sample S(k−1) 606 is weighted by tap weight value w1 608 using a tap multiplier 610, the next older sample S(k−2) 612 by tap weight value w2 614; successive samples are weighted by N−2 additional tap weight values up to the oldest shift register sample S(k−N) 616 weighted by wN 616. The weighted samples are summed and truncated in the adder 620 to produce the IF output signal 622. The filter output may be viewed as the convolution of the input IF signal with an impulse response vector formed by the tap weight values.

The most general structure for a filter with real tap weights is shown in FIG. 6. In many cases, the tap weight values will exhibit end-for-end symmetry. In such cases, the total number of tap weight multipliers 610 can be halved. Weight w1 608 multiplies the two sample sum S(k−1)+S(k−N), weight w2 614 multiplies the sum S(k−2)+S(k−N+1), etc. The resultant filter response is identical to that of the filter of FIG. 6; however, half the number of tap multipliers 610 are used, thereby conserving FPGA resources. Such simplifications of the filter architecture are encompassed by the present invention.

For purposes of illustration, the IF signal input 602 samples in FIG. 6 are shown as 12 bit quantities; tap weight values 608, 614 and 618 as 10 bit quantities and the IF signal output 622 samples as truncated to 16 bits. These bit widths represent practical choices; however, other choices of bit widths for the IF signal input 602, tap weight values 608, 614 and 618 and truncated IF signal output 622 are possible and may be desirable depending on the application. Such filter tap weight value choices are encompassed by the present invention.

Figure 7:
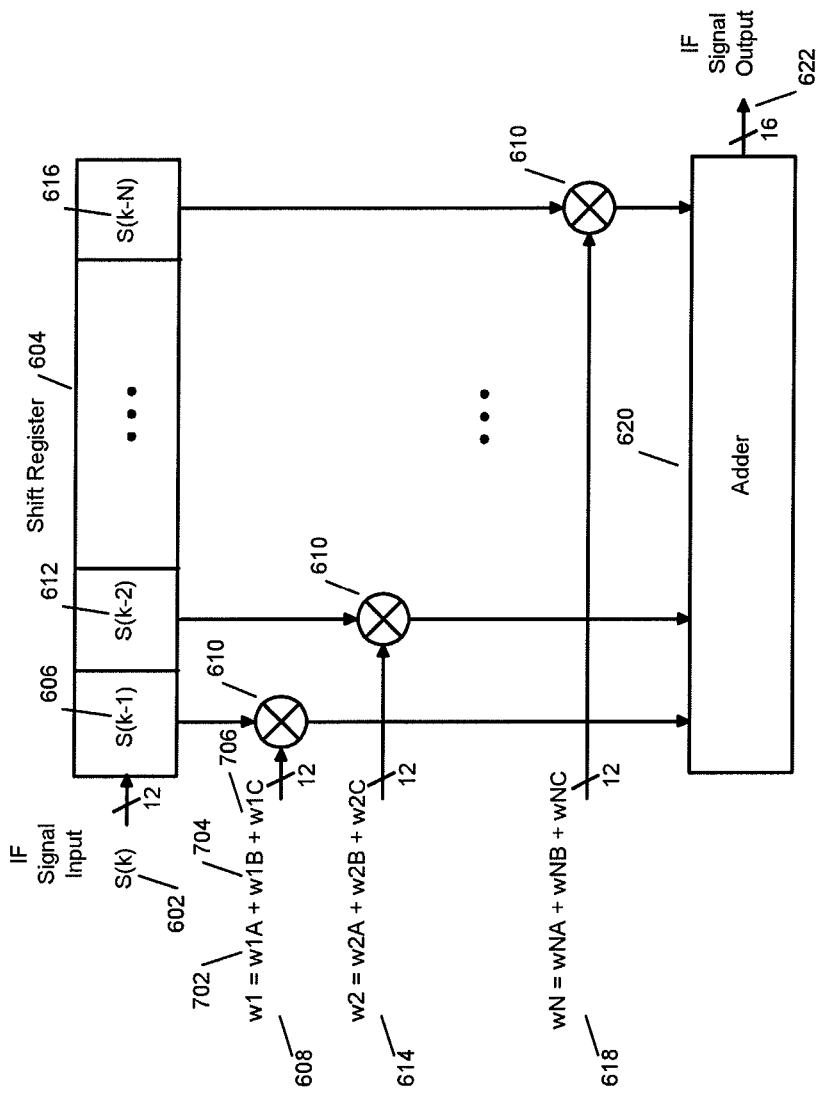
FIG. 7 illustrates a two sub-band IF bandpass FIR filter structure.

A bandpass filter for multiple sub-bands may be implemented by a parallel array of FIR filters of the type shown in FIG. 6. If, as in the repeater application, the outputs of the parallel array of FIR filters are summed and not required to be available individually, then a multi-band filter may be implemented using only slightly more FPGA resources than are required for a single sub-band filter. The multi-band filter architecture is shown in FIG. 7 and comprises a shift register 604, tap weight multipliers 610, tap weight values 608, 614 and 618 and an adder 620. In FIG. 7, which shows a three sub-band filter for purposes of illustration, coefficients for each of the three sub-band filters (denoted w1A 702, w1B 704 and w1C 706, respectively, for the first shift register 604 stage tap weight values) are added together to form the composite first tap weight value w1 608. The remainder of the filter structure is as before. Here it is assumed that each of the sub-band filters has the same number of taps. In the event that differing numbers of taps are required for any of the sub-band filters, the shorter filters may be zero-padded. Such filter techniques are encompassed by the present invention.

Note that the only effect of implementing three sub-bands, as shown in FIG. 7, is to widen the coefficient bit width from 10 bits to 12 bits. The length and bit-width of the shift register 604, number of tap multipliers 610 and complexity of the adder 620 are unaffected in going from a single sub-band bandpass filter to a multi-sub-band bandpass filter using the techniques of the present invention. In general, for a multi-band filter, the coefficient bit width would increase by log 2(M) where M is the number of filter passbands and the logarithm is to the base two. For example, if eight pass bands are required, the coefficient bit width would increase by log 2(8) or 3 bits. In the case of the filter of FIG. 6, for which each sub-band filter has 10 bit coefficients, eight pass bands could be implemented using identical hardware with the exception that tap weight values 608, 614 and 618 are 13 bit quantities. The increased coefficient bit width represents a modest increase in FPGA resources consumed.

Figure 8:
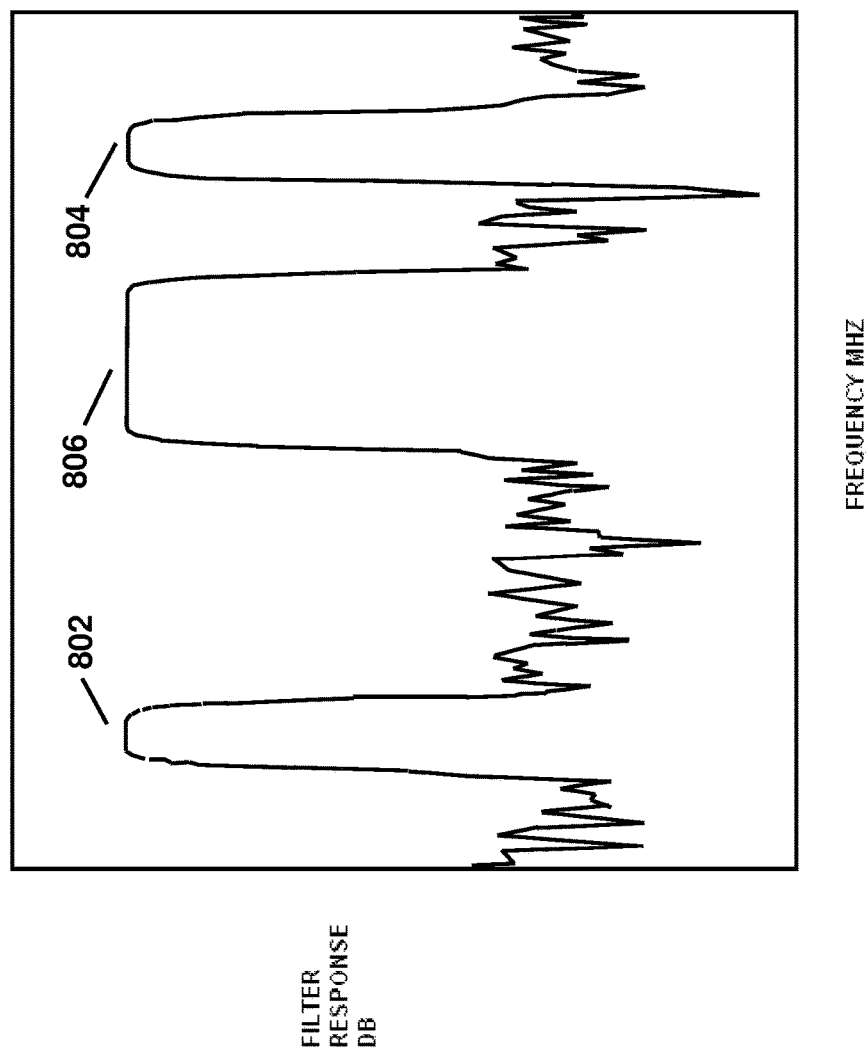
FIG. 8 illustrates a multi-band filter response.

FIG. 8 is a response plot for a three sub-band filter in which each of the sub-band filters uses 300 taps with 10 bit coefficients. There are two 5 MHz bandwidth pass bands 802 and 804 and one 15 MHz bandwidth pass band 806. The composite filter uses 12 bit coefficients. For the theory of FIR filters see S. K. Mitra, Digital Signal Processing, $2^{nd}$ ed., McGraw Hill, New York, N.Y., 2001.

In addition to the multi-band filter, the FPGA configuration includes a full band Hilbert transform all-pass FIR filter (not shown). This filter is used to produce an additional output in quadrature with output of the multi-band filter. The inphase and quadrature outputs of the FPGA are used to drive dual 2× interpolating DACs. The two filtered dual DAC output signals 312 and 314 permit use of a single sideband up conversion mixer which reduces the level of the undesired up conversion sideband and thereby facilitates post-conversion filtering. The effective sample rate internal to the interpolating DAC 506*a* and 506*b* circuitry is double the external 160 MHz clock rate. Interpolated null samples are provided by the DAC circuitry. Using interpolation facilitates post conversion filtering by moving DAC output aliases up from 90 MHz to 250 MHz. Non-interpolating single or dual DACs may be used with or without single sideband upconversion with more complex post-conversion filters. Use of such alternate up conversion architectures are encompassed by the present invention.

The FPGAs 504 may be configured using a microcontroller from a program stored in flash memory. In addition to configuring the FPGA the controller may manage the AGC (Automatic Gain Control) loops which control the input variable attenuators and transmit power. Such use of a microcontroller is encompassed by the present invention. Unlike the conventional repeater as shown in FIG. 2, the selective repeater of FIG. 3 requires independent control of the input variable attenuators and of the transmit drive signal level in both the uplink and downlink directions. The transmit power may be controlled by varying the FPGA output scaling in response to the detected output level. If a digitized transmit output is available, as in the outdoor repeater discussed below, the digitized signal may be detected and used for output leveling purposes.

In the preferred implementation, the uplink digital processor hardware is identical to that of the downlink digital processor. However, the uplink multi-band filter is spectrally inverted because the down converting frequency mixer uses high side local oscillator injection. Other than the requirement to be compatible with the signal spectral inversion the design details and configuration of the uplink FPGA are the same as those of the downlink FPGA 504. The frequency inversion between the uplink and downlink multi-band filters is a consequence of the frequency plan chosen for the preferred implementation. Other frequency plans may be used in which frequency inversion does not take place between uplink and downlink pass bands or where the pass bands are related in some other way. Such frequency plans are encompassed by the present invention. In any event, the impact of signal spectral inversion on FPGA resources used and configuration of the FPGA may be minimal.

Figure 9:
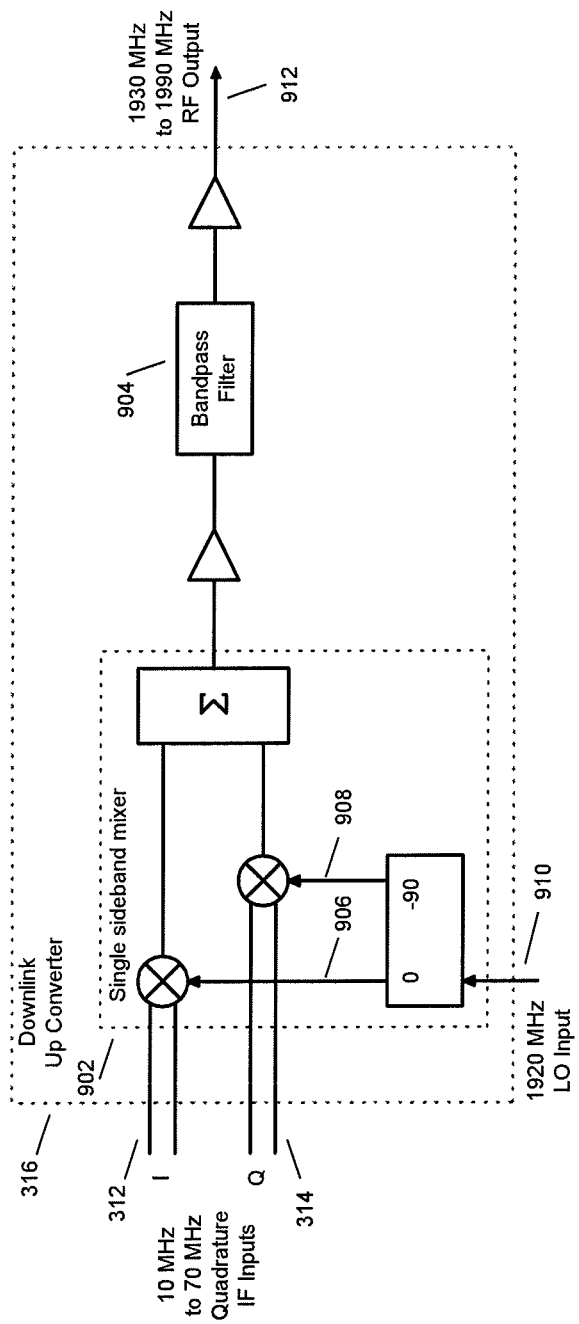
FIG. 9 illustrates a repeater upconverter.

Referring to FIG. 9, the downlink upconverter 316 accepts differential inphase and quadrature IF inputs 312 and 314 from the downlink digital processor 310. The differential inphase and quadrature IF inputs 312 and 314 are applied to a single sideband frequency mixer 902 and upconverted to the downlink frequency band. The upconverted signal is filtered with a bandpass filter 904 and amplified to the nominal RF output 912 amplitude level. The single sideband mixer 902 develops quadrature LO signals 906 and 908 internally from a single external 1920 MHz LO input 910 signal. As in the case of the down converter circuitry described above, the differential configuration of the inphase and quadrature IF input 312 and 314 signals minimizes susceptibility to unwanted interference. Single-ended IF input signals may be used in some applications. Double sideband upconversion rather than single sideband upconversion may be used; the tradeoff being between converter complexity and post-conversion filter complexity. Such alternate frequency conversion techniques are encompassed by the present invention.

Figure 10:
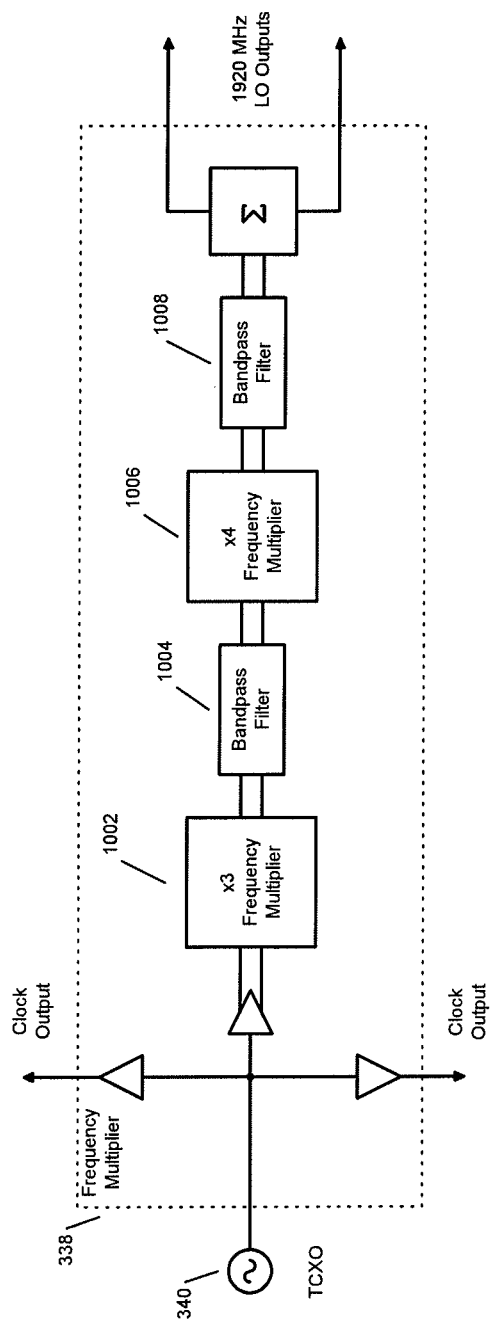
FIG. 10 illustrates an LO generation circuitry block diagram.

FIG. 10 shows the LO and clock generation circuitry. Referring to FIG. 10, a temperature controlled crystal oscillator, TCXO 340 provides a 160 MHz sampling clock that is used by both the uplink digital processor 332 and downlink digital processor 310. The TCXO 340 output is also frequency multiplied by a factor of 12 using frequency multipliers 1002 and 1006 and bandpass filters 1004 and 1008 to generate the 1920 MHz LO output 1010 signal that is used as up and down converting LO for both the uplink and downlink arms of the bi-directional repeater 102. The frequency plan uses low phase noise direct synthesis to generate the uplink and downlink LO signals thereby lowering the phase noise transferred to the uplink and downlink signals. Phase locked loops may be used here for generating the LO signal and may be more appropriate in cases for which the frequency plan is not convenient for direct synthesis. Such alternate LO and clock generation techniques are encompassed by the present invention.

In outdoor repeater applications in which donor and coverage antennas may be co-located, poor isolation between the antennas may limit repeater performance. If, for example, the antennas are pole mounted and isolation is in the 30 dB range, maximum repeater gain will be limited to roughly 20 dB. At higher repeater gains severe distortion of the repeater passband may occur. By comparison, typical maximum gain for an indoor repeater is on the order of 80 dB.

Figure 11:
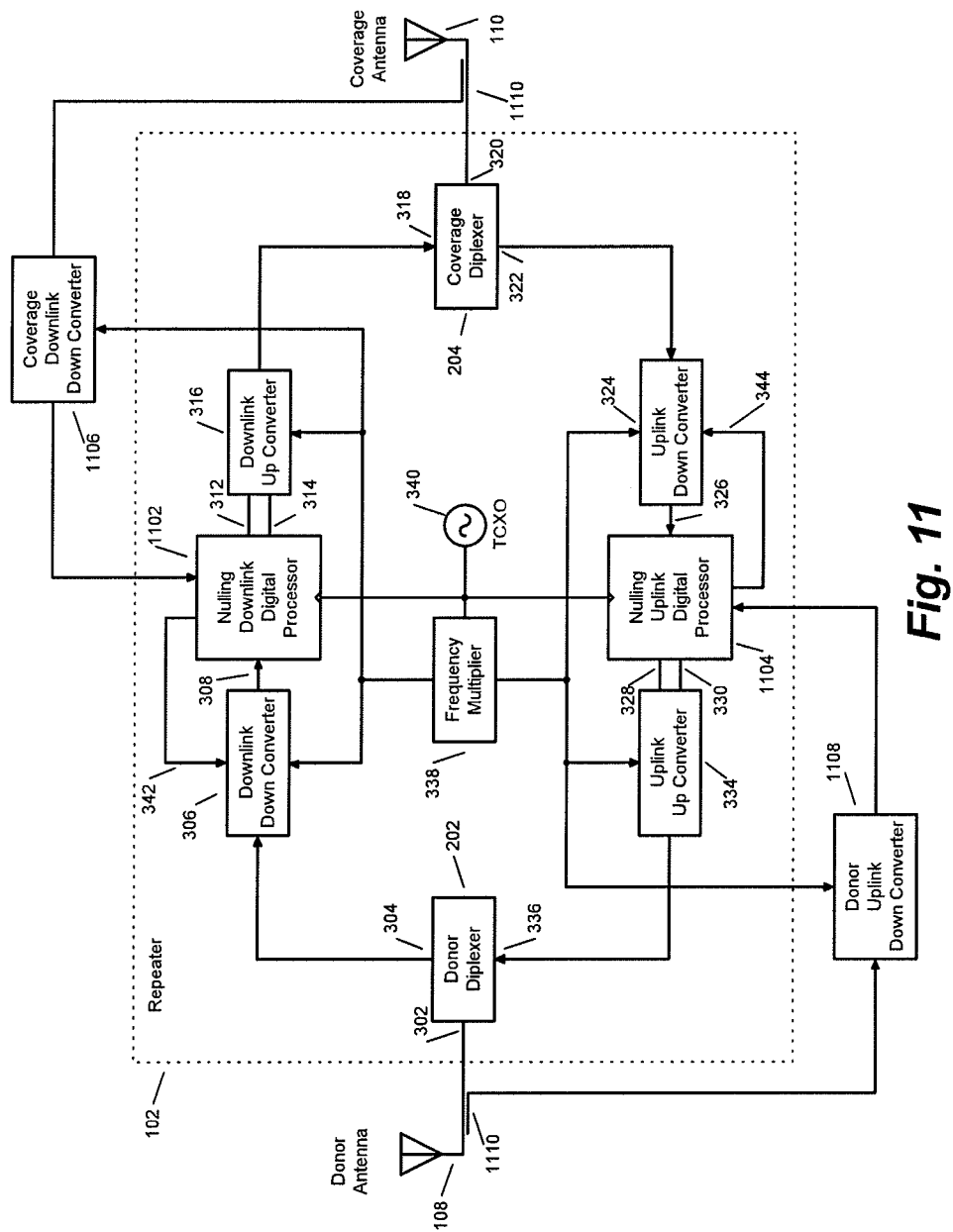
FIG. 11 illustrates a repeater with adaptive cancellation.

With the addition of output down converters and with the associated down converted output signal digitization performed internal to the uplink and downlink signal processors, the processing repeater architecture shown in FIG. 3 may be extended for adaptive cancellation of broadband antenna leakage. Adaptive leakage cancellation permits repeater gains greater than 30 dB above the antenna isolation. FIG. 11 shows an extended repeater with additional processing blocks used for adaptive cancellation.

Referring to FIG. 11, a downlink coverage downconverter 1106 and uplink donor downconverter 1108 downconvert the downlink and uplink transmitted signals. The downlink coverage downconverter 1106 and uplink donor down converter 1108 employed are similar to the uplink downconverter 324 and downlink down converter 306. Down converters 1106 and 1108 generally may not require RF variable attenuation 402a and 402b because transmitted signal amplitudes are controlled by the nulling digital processors 1102 and 1104. In applications which require additional control of the downconverted signal levels, RF variable attenuators may be used. Such level control means are encompassed by the current invention. The downlink and uplink transmitted signals are sampled using directional couplers 1110. Other sampling means such as direct, non-directional RF signal taps with or without employing RF isolators may be used and such sampling means are encompassed by the present invention. In FIG. 11 the down converted downlink and downconverted uplink transmitter output signals are fed back to the nulling downlink and uplink digital processors 1102 and 1104, respectively. The down converted signals are digitized internal to the nulling downlink and uplink digital processors 1102 and 1104 and used to drive adaptive cancellation circuitry within the FPGA circuitry. Details of the FPGA adaptive cancellation circuitry are shown in FIG. 12.

Figure 12:
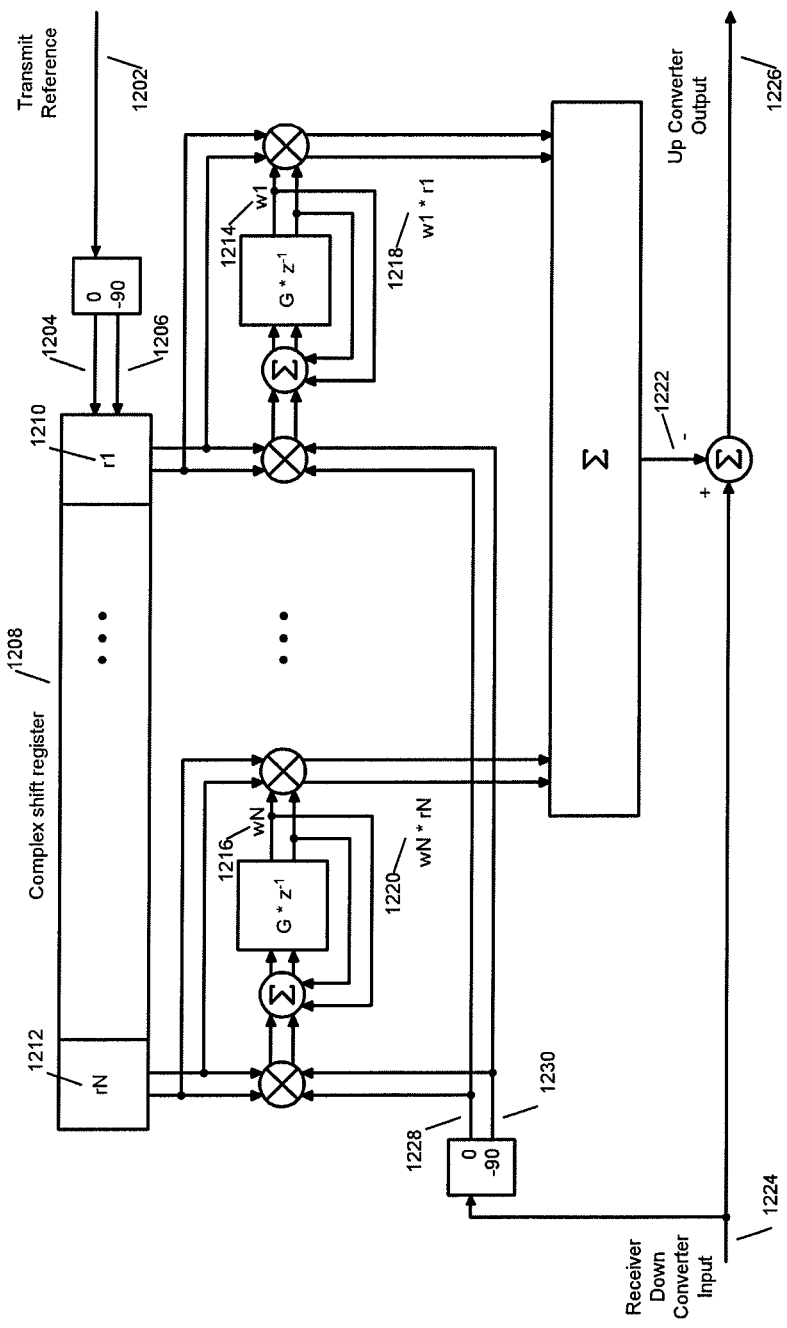
FIG. 12 illustrates an adaptive cancellation circuit.

Referring to FIG. 12, the transmit reference signal 1202 to the cancellation circuitry is resolved into inphase quadrature components 1204 and 1206 and the components are shifted into a complex shift register 1208. The shift register 1208 tap signals, r1 1210 through rN 1212, are weighted by complex weight values, w1 1214 through wN 1216, to form weighted reference terms, w1*r1 1218 through wN*rN 1220. The weighted terms w1*r1 1218 through wN*rN 1220 are summed to form a leakage estimate 1222. The leakage estimate 1222 is then subtracted from the receiver down converter input 1224 to form the upconverter output 1226. The weights themselves are derived by accumulating complex error values formed by multiplying the complex shift register tap signals by the complex receiver down converter input 1224, resolved into inphase and quadrature components 1228 and 1230, respectively. The weight values may be updated at a rate much lower than the rate at which the nulling digital processor 1102 and 1104 inputs are digitized. In FIG. 12 double lines indicate complex signals or processing. The cancellation processing may involve delaying the cancelled signal to de-correlate the received and repeated received signal.

The cancellation circuitry is a hardware implementation of the LMS algorithm. The number of taps, N, depends on details of the application, in particular on the departure of the leakage phase transfer characteristic from linear phase versus frequency. Increasing the number of taps and associated circuitry within the Nulling Digital Processors 1102 and 1104 increases the cancellation bandwidth. A single tap implementation may be appropriate in some applications and is encompassed by the present invention.

The LMS algorithm offers the advantage of simplicity in exchange for fast adaptation response. In the majority of fixed location outdoor repeater applications, the repeater environment is slowly changing; so, fast adaptation is not required. Other adaptive algorithms such as RLS may also be used and may be preferable in certain situations. The programmable feature of the preferred implementation lends itself to a variety of algorithms. Such algorithms and the associated implementations are encompassed by the present invention. Adaptive algorithms are covered in S. Haykin, Adaptive Filter Theory, 4th ed., Prentice Hall, Upper Saddle River, N.J.

In many cases, such as last mile applications, selectivity may be desirable without the necessity of filtering down to the individual cellular channel bandwidth. In these cases the selective repeater described above offers an economical alternative to the channelizing repeaters currently used in mini-cellsite infrastructure applications.

Use of the selective repeater architecture is not restricted to telephony. In wireless LAN (Local Area Network) or WAN (Wide Area Network) applications, repeaters may be necessary to achieve desired coverage. For IEEE 802.11 compliant networks, signal bandwidths are relatively wide and channel frequencies may be changed frequently. Because of the unregulated nature of the communications, the likelihood of nearby unwanted signals is often present. Implementing selectivity at RF frequencies would also typically be out of the question because of cost and reconfigurability considerations. For these reasons digitally implemented programmable selectivity may be a good fit for wireless network applications.

As the cost of FPGAs and associated hardware drops and performance increases in response to the growing complexity and pervasiveness of broad band communications systems, new applications of the repeater technology discussed above will come into being. With the increasingly crowded communications bands selectivity, interference immunity and reconfigurability will be at a premium. Just as with other technologies which may have been considered exotic, programmable selective repeater technology may also become commonplace.

A repeater according to the principles of the present invention may be used in a number of applications, such as, repeating cell phone network communication signals (or other wireless transmissions) through the inside of buildings and facilities where signal strength from externally located transmission towers is low or non-existent. For example, a repeater according to the principles of the present invention may be used to repeat communication signals within a shopping mall, a government building, a vehicle, a commercial building, a sports facilities, a studio, a buildings, an office, a train station, a subway station, a bus station, a transportation station, an airport terminal, an airport facility, retail store, retail environment, commercial environment or the like.

Figure 13:
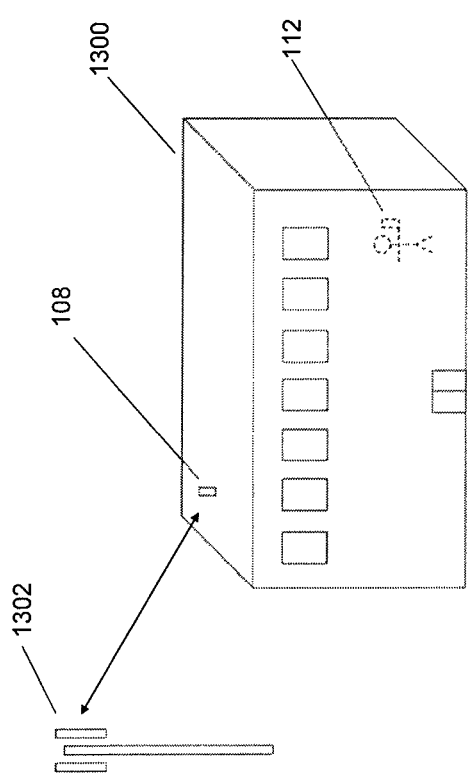
FIG. 13 illustrates use of the invention in a building.

FIG. 13 illustrates an embodiment of the invention where a repeater (not shown in this figure) (e.g. bi-directional repeater as described herein above) is associated with a building 1300 or other substantially enclosed facility or facility that significantly attenuates communication signals. In this embodiment, the donor antenna 108 of the repeater system is mounted external to the building 1300 and the coverage antenna of the repeater system (not shown in this figure) is mounted internal to the building 1300 such that communication between a cell phone transmission tower 1302 and a user's mobile communication device (e.g. cell phone) 112 is facilitated.

While the invention has been described in connection with certain preferred embodiments, it should be understood that other embodiments would be recognized by one of ordinary skill in the art, and are incorporated by reference herein.

What is claimed is:

1. A method, comprising:
   processing a signal received by a wireless signal repeater through a digital signal processor (DSP), the DSP concurrently processing a plurality of bands of the signal by using a multi-band filter system that processes a sample of the signal with a plurality of tap weight coefficients, the bit widths of which are sized based on a count of the plurality of bands being filtered, a different coefficient of the plurality of tap weight coefficients used to process the sample at each of a plurality of time-shifted stages, wherein a count of the stages is independent of a count of the plurality of bands.

2. The method of claim 1 wherein the bit widths of the filter tap coefficients are sized to include at least a count of bits that equals a base 2 logarithm of a count of pass bands being filtered plus 1.

3. The method of claim 1 wherein the bit widths of the filter tap coefficients are sized to include a single band count of bits plus a base 2 logarithm of a count of pass bands being filtered.

4. The method of claim 1 further comprising summing an output of each of the plurality of stages, wherein the summing is performed independent of the count of the plurality of bands.

5. The method of claim 4 wherein the multi-band filter processes at least two bands of the signal.

6. The method of claim 1, wherein the repeater is a digital filter that comprises composite filter coefficients that are formed by summing coefficients for each sub-bandpass filter.

7. A method, comprising:
   processing a signal received by a wireless signal repeater through a digital signal processor (DSP), the DSP concurrently processing a plurality of bands of the signal using a composite multi-sub-band bandpass filter adapted to process the plurality of bands by processing a sample of the signal with one of a plurality of tap weight coefficients at each of a plurality of time-shifted stages, the coefficients sized based on a count of the plurality of bands being filtered, wherein a count of the plurality of time-shifted stages is independent of a count of the plurality of bands; and
   adaptively cancelling transmitter wrap-around leakage.

8. The method of claim 7 wherein the adaptively cancelling includes an adaptively weighted transmission sample.

9. The method of claim 7 further comprising providing an interface adapted to select at least one sub-band.

10. The method of claim 7 wherein the repeater includes filter tap weight coefficients with bit widths that are sized based on a count of the plurality of bands being filtered.

11. The method of claim 10 wherein the bit widths of the filter tap coefficients are sized to include at least a count of bits that equals a base 2 logarithm of a count of pass bands being filtered plus 1.

12. The method of claim 10 wherein the bit widths of the filter tap coefficients are sized to include a single band count of bits plus a base 2 logarithm of a count of pass bands being filtered.

13. The method of claim 12 wherein the repeater includes filter tap multipliers comprising bit widths that are sized based on a count of the plurality of bands being filtered.

14. The method of claim 7, wherein the composite multi-sub-bandpass filter is a digital filter that comprises composite filter coefficients that are formed by summing coefficients for each sub-bandpass filter in the multi-sub-bandpass filter.

15. A system, comprising:
- a cell phone transmission signal repeater that includes a digital multi-sub-band bandpass filter for concurrently digitally filtering a plurality of sub-bands of a composite multi-band signal;
- a plurality of tap weight multipliers, wherein a count of the plurality of tap weight multipliers is independent of the count of the plurality of sub-bands; and
- a plurality of filter tap coefficients with bit widths that are sized based on a count of the plurality of sub-bands of the composite multi-band signal.

16. The system of claim 15 wherein the bit widths of the filter tap coefficients are sized to include at least a count of bits that equals a base 2 logarithm of a count of pass bands being filtered plus 1.

17. The system of claim 15 wherein the bit widths of the filter tap coefficients are sized to include a single band count of bits plus a base 2 logarithm of a count of pass bands being filtered.

18. The system of claim 15 wherein the repeater processes any number of sub-bands of the signal with the FIR filter.

19. The system of claim 18 wherein the FIR filter processes at least two sub-bands of the plurality of sub-bands.

* * * * *